United States Patent [19]
Green

[11] Patent Number: 5,888,022
[45] Date of Patent: Mar. 30, 1999

[54] METHOD AND SYSTEM FOR TREATING BIO-DEGRADABLE WASTE MATERIAL THROUGH AEROBIC DEGRADATION

[75] Inventor: Leon C. Green, Aiken, S.C.

[73] Assignee: Environmental Control Systems, Inc., Aiken, S.C.

[21] Appl. No.: 873,265

[22] Filed: Jun. 11, 1997

[51] Int. Cl.⁶ .............. E21B 43/12; E21B 47/06; B09B 1/00; A62D 3/00
[52] U.S. Cl. .................. 405/129; 71/9; 210/610; 210/620; 210/901; 166/52; 166/53; 166/246; 166/250.01; 588/205; 588/249; 588/260; 588/900
[58] Field of Search ............... 166/52, 53, 246, 166/250.01, 268; 71/9; 210/610, 620, 747, 170, 901; 405/128, 129; 435/262.5; 588/205, 249, 259, 260, 900

[56] References Cited

U.S. PATENT DOCUMENTS

| | | | |
|---|---|---|---|
| 4,323,367 | 4/1982 | Ghosh | 405/129 X |
| 4,849,360 | 7/1989 | Norris et al. | 405/128 X |
| 5,063,519 | 11/1991 | Zison | 166/250.01 X |
| 5,265,979 | 11/1993 | Hansen | 405/129 |
| 5,286,140 | 2/1994 | Mather | 405/128 |
| 5,324,138 | 6/1994 | Hansen | 405/129 |
| 5,356,452 | 10/1994 | Fahey | 405/129 X |
| 5,478,464 | 12/1995 | Cyr | 210/170 X |
| 5,564,862 | 10/1996 | Markels, Jr. | 405/129 |

FOREIGN PATENT DOCUMENTS

0509980A2  1/1995  European Pat. Off. .

*Primary Examiner*—George Suchfield
*Attorney, Agent, or Firm*—Dority & Manning

[57] ABSTRACT

A system and method are provided for treating biodegradable waste material in a landfill by aerobic degradation. Waste material is deposited in the landfill and covered. The moisture content in the landfill is increased from about 40% to about 70% and a source of oxygen is injected into the landfill to drive and maintain primarily aerobic degradation of the waste material. The temperature in the landfill is increased to substantially eliminate pathogens from the waste material. The temperature in the landfill is controlled within a range of about 130° F. to about 150° F. to sustain the primarily aerobic degradation. Any combination of oxygen content, moisture content, and temperature in the landfill is monitored and varied to sustain and maintain the primarily aerobic degradation in the landfill.

43 Claims, 6 Drawing Sheets

METHOD AND SYSTEM FOR TREATING BIO-DEGRADABLE WASTE MATERIAL THROUGH AEROBIC DEGRADATION

BACKGROUND OF THE INVENTION

The present invention relates to a method and system for treating biodegradable waste material, and particularly to an aerobic degradation process and system in a landfill.

The state of the art in landfill systems is inadequate sufficient to address the critical concerns involved with disposal of tons of garbage and waste material produced every day in major metropolitan areas. In many existing landfills, the garbage and waste material is simply buried in a landfill site. The landfills are filled with garbage and waste and covered when completely filled. In essence, the garbage and waste material is essentially entombed as a final solution. Strict environmental regulations govern all aspects of landfill closure and monitoring and the landfill and surrounding area, including ground water and atmosphere, must be monitored for up to thirty years after closure until potentially harmful by-products of the degradation process are no longer produced. This is an extremely costly venture and the landfill is essentially useless for any other purpose. If problems do occur, such as ground water contamination, the owner of the landfill is liable for clean-up costs as well as any environmental damage.

The waste material in the conventional landfills typically degrades by anaerobic degradation (without oxygen). This is an extremely slow process that produces objectional gases and other by-products potentially harmful to the environment. Under typical anaerobic conditions established in conventional landfills, the biodegradable waste material is entombed in a virtually dry and oxygen deficient state. Because the landfill lacks necessary oxygen and moisture, there is very limited biodegradation and that degradation which does occur is substantially only anaerobic. The degradation is very slow and it can take from twenty to thirty years or longer for the process to stabilize to a point where it must no longer be monitored. During the long degradation period, emissions from the degrading organic material contain objectional odors and methane gas. Also, once all of the sites at the landfill have been filled and closed, the landfill is no longer useful and an additional site must be located at great expense.

Thus, what is needed is an alternative to conventional landfills that addresses the problems noted above.

U.S. Pat. No. 5,356,452 issued to Fahey on Oct. 18, 1994, proposes an improvement to an anaerobic degradation system in a landfill. This patent proposes to seal off the landfill cell from the surrounding environment by a liner and a domed cover structure that maintains a positive pressure within the structure and which allows for the passage of vehicles and so forth into the structure to deposit waste material into the cell. This patent also teaches that the domed structure limits the amount of additional moisture added to the cell during its filling to reduce the rate of decomposition of the waste. Once the cell is completely full, a cover is placed over the cell which helps to reduce the formation of leachate by preventing the introduction of surface or rain water into the waste material. The patent also teaches that once covered, water or the like may be added to the decomposing material to accelerate its decomposition. Methane gas or other gaseous byproducts of the bio-reduction process are bled off from the cell and the methane gas or the like may be collected and used to run engines or generate electricity.

OBJECTS AND SUMMARY OF THE INVENTION

It is thus a principle object of the present invention to provide a method and system for treating waste material in a landfill through aerobic degradation.

It is an additional principle object of the present invention to provide a landfill system that substantially reduces the amount of time necessary for the degradation process to stabilize so that the land can be recycled or used for other purposes.

An additional object of the invention is to provide a method and system for treating waste material in a landfill that substantially eliminates the disadvantages of anaerobic degradation systems.

And still a further object of the present invention is to provide a system wherein a landfill can be continuously recycled so as to substantially reduce the necessity for additional and expensive land.

And still another object of the present invention is to provide a portable system for promoting and maintaining aerobic degradation in a landfill that can be readily moved and reestablished from one landfill site to another.

Additional objects and advantages of the invention will be set forth in part in the following description, or may be obvious from the description, or may be learned through practice of the invention.

To carry out the purposes and realize the advantages of the invention, the present method is premised on establishing conditions within the landfill to promote and maintain primarily only aerobic degradation of the waste material. Moisture content in the landfill mass is monitored and maintained between about 40% to about 70% by adding additional water or the like into the landfill. Preferably, the water added into the landfill comprises leachate collected from the landfill. Thus, the leachate is continuously recycled back into the landfill thereby significantly reducing the concern and expense of treating or disposing of the collected leachate. An additional make-up supply of water is also available to ensure that sufficient moisture is maintained in the landfill mass.

Oxygen content of the landfill mass is also monitored and oxygen is injected into the landfill to promote and maintain primarily aerobic degradation of the waste material. Preferably, compressed air is the source of oxygen and is injected into the landfill mass through injection wells to ensure that the oxygen content remains above 0%. In this manner, it is ensured that sufficient oxygen is being supplied to sustain aerobic degradation. So long as oxygen is being supplied into the landfill and the oxygen concentration in the landfill remains relatively low, generally just above 0%, it is ensured that sufficient oxygen is being supplied to promote and maintain primarily aerobic degradation.

The temperature in the landfill is maintained in the ideal range of about 130° F. to about 150° F. This temperature range is maintained by controlling the amount of air, moisture, or oxygen concentration in the landfill.

It is also preferred to elevate and maintain the temperature in the landfill at a level sufficient to kill off harmful pathogens in the waste material. For example, temperatures above 135° F. are generally required to eliminate the pathogens. However, at 135° F., the temperature must be maintained for a period of at least about two weeks. At a temperature of 155° F., the pathogens are killed off in days. However, at temperatures above about 145° F., some of the desirable aerobic microbes are also killed thus limiting the aerobic activity. Accordingly, in one embodiment of the present method, the pathogens are eliminated substantially at the same time that the aerobic activity is promoted and maintained by maintaining the temperature above 135° F. but less than about 150° F. for at least a period of weeks. Alternatively, the pathogens can be eliminated before the aerobic activity is established and maintained by elevating the temperature in the landfill to 155° F. for at least several days prior to establishing the aerobic temperature and moisture ranges. With this method, it may be necessary to add aerobic microbes back into the landfill prior to establishing the aerobic degradation.

The method and system according to the invention includes establishing a grid of air injection wells and moisture or water injection wells throughout the landfill. A substantially automated system controls the amount of water and oxygen (in the form of compressed air) injected into the landfill mass in response to a monitoring system that monitors temperature, oxygen content, and moisture content. The monitoring system also may monitor the generation or production of gases within the landfill as an indication of the type of degradation occurring. For example, the presence and concentration of methane gas generated in the landfill mass is a strong indication of the type of microbial activity. Methane is a primary by-product of anaerobic degradation. If methane is maintained generally less than 10% by volume and no strong odors are detected from the by-products, this is a strong indication that aerobic degradation is being maintained, particularly if air or oxygen is being injected into the system and oxygen concentrations are maintained greater than 0% by volume. Methane concentrations approaching 50% is a strong indication that the microbial activity is primarily anaerobic.

Temperature within the landfill mass is a critical element in promoting and maintaining the aerobic degradation. The ideal range of about 130° F. to about 150° F. can be controlled by a combination of factors, but preferably is controlled primarily by the injection of air into the landfill. The temperature can also be controlled by the moisture content. However, the system reacts much faster to changes in oxygen or air content. For example, if temperature in the landfill is being driven higher than 150° F., additional air is injected into the system to drive the temperature back into the ideal range. It is believed that the additional air acts as a medium to carry off excess heat generated by the microbial activity. It is also believed that the additional oxygen reduces any remaining anaerobic degradation activity since the anaerobic microbes cannot live in the presence of oxygen. Thus, the heat being generated by such anaerobic activity is also eliminated. If temperature in the system is too low, the amount of air injected into the system is decreased so that the heat generated by the microbial activity (aerobic or anaerobic) is not dissipated as fast and therefore increases the temperature within the landfill mass.

The present system and method also includes adding additional nutrients into the landfill by way of the injection wells to further promote the aerobic degradation. For example, any combination of nitrogen, phosphates, and carbon source may be injected into the system to maintain optimal levels of microbial growth for the aerobic degradation. Also, the aerobic microbes may also be supplemented through the injection system. It has been found that a preferred concentration ratio of carbon to nitrogen in the range of about 20:1 to about 50:1 is desired.

Temperature is also monitored as an indication of complete or stabilized degradation. A decrease in temperature in the landfill despite an increase in oxygen levels is a strong indication that the degradation process is nearly complete and that the biodegradable material has stabilized. At this point, the waste material has been essentially composted and the landfill is stabilized. Additional monitoring of the landfill may no longer be needed.

The present inventive method includes the process of land mining the stabilized landfill to remove non-degraded solid waste for alternate disposal. At this point, the landfill can then be recycled for continuous use, thus substantially eliminating the need for new landfills. Alternatively, the stabilized landfill can be made available for other uses. The stabilized degraded landfill material can also be landmined and used as compost material in non-agricultural and agricultural uses depending on the extent of pathogen purification from the material.

The system according to the present invention for aerobic degradation of biodegradable waste material in a landfill includes a landfill site wherein the waste material has been deposited and covered with a cover material, such as a cover of surface dirt or soil. A plurality of injection wells are disposed through the cover material and provide access to the waste material in the landfill. Means are provided for periodically monitoring the moisture content, oxygen concentration, and temperature within the landfill mass. Means are also provided for variably adding oxygen into the landfill, preferably in the form of compressed air, to maintain a source of oxygen in the landfill mass sufficient to promote and maintain aerobic activity. Means are also provided to control the temperature within the landfill mass within a range of preferably about 130° F. to about 150° F. Finally, means are provided to variably add moisture or water into the landfill through the injection wells so as to maintain aerobic degradation conditions of moisture content in the landfill within a range of about 40% to about 70%. The structure defining these various means are described in greater detail in the description of the preferred embodiments.

DETAILED DESCRIPTION OF THE PREFERRED EMBODIMENTS

Reference will now be made in detail to the presently preferred embodiments of the invention, one or more examples of which are illustrated in the enclosed drawings. Each example is provided by way of explanation of the invention, and not meant as a limitation of the invention. For example, features illustrated or described as part of one embodiment can be combined with another embodiment to yield still a further embodiment. It is intended that the present invention cover such modifications and variations of the invention.

The present invention relates to a method and system for treating biodegradable waste material in a landfill by promoting and maintaining primarily aerobic degradation of the waste material. The process is designed to establish and maintain conditions in the landfill to promote rapid aerobic degradation of organic material, such as paper, foodstuffs, and wood. The system also substantially eliminates harmful pathogens from the landfill waste material. Once the bio-reduction process according to the invention has stabilized, the landfill can undergo a process of conventional landmining to recycle the landfill for further use. Alternatively, the landfill can be made available for other non-landfill uses.

Figure 1:
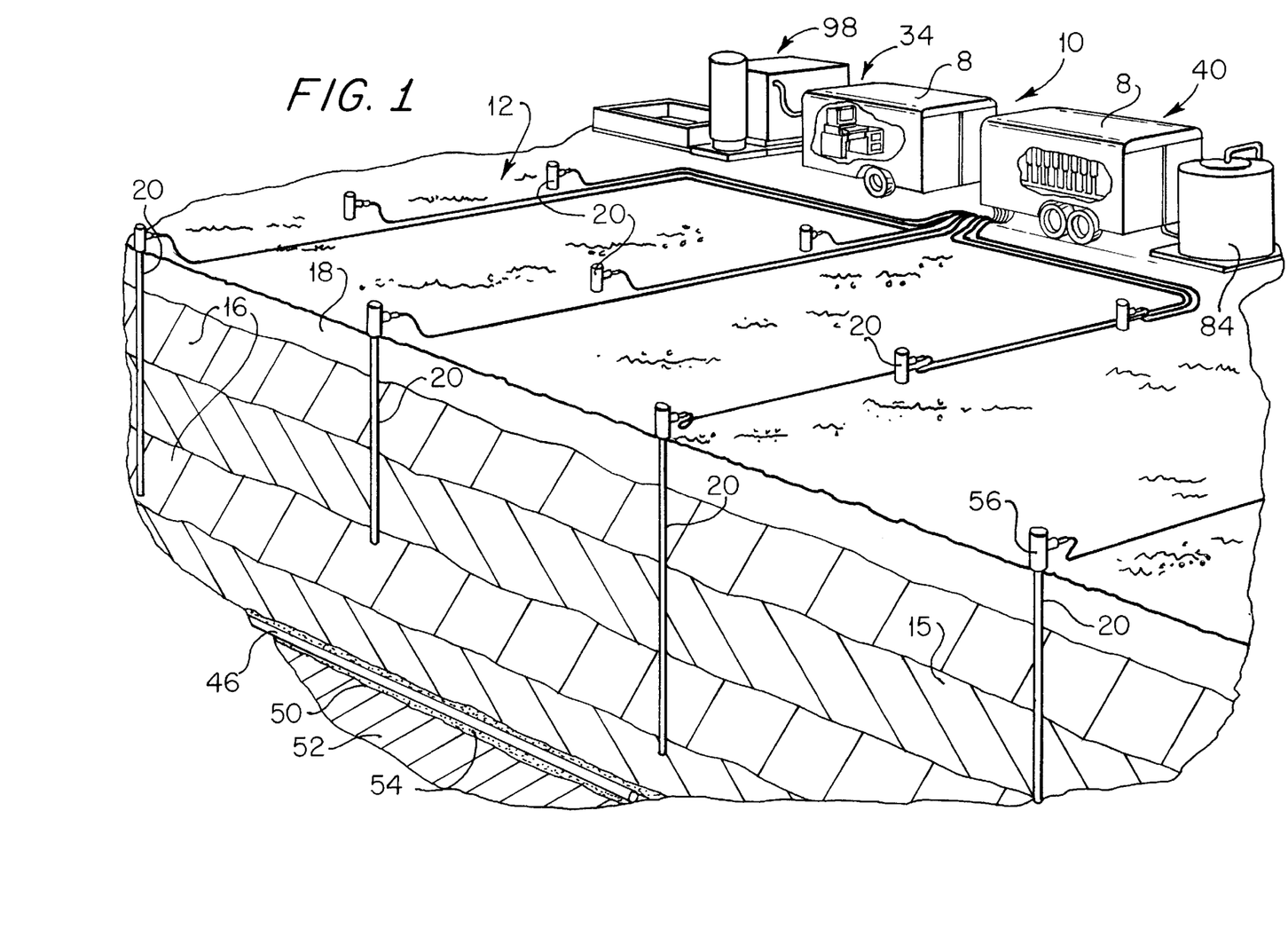
FIG. 1 is a perspective view of an embodiment of the system according to the invention for practicing the method thereof.
Figure 2:
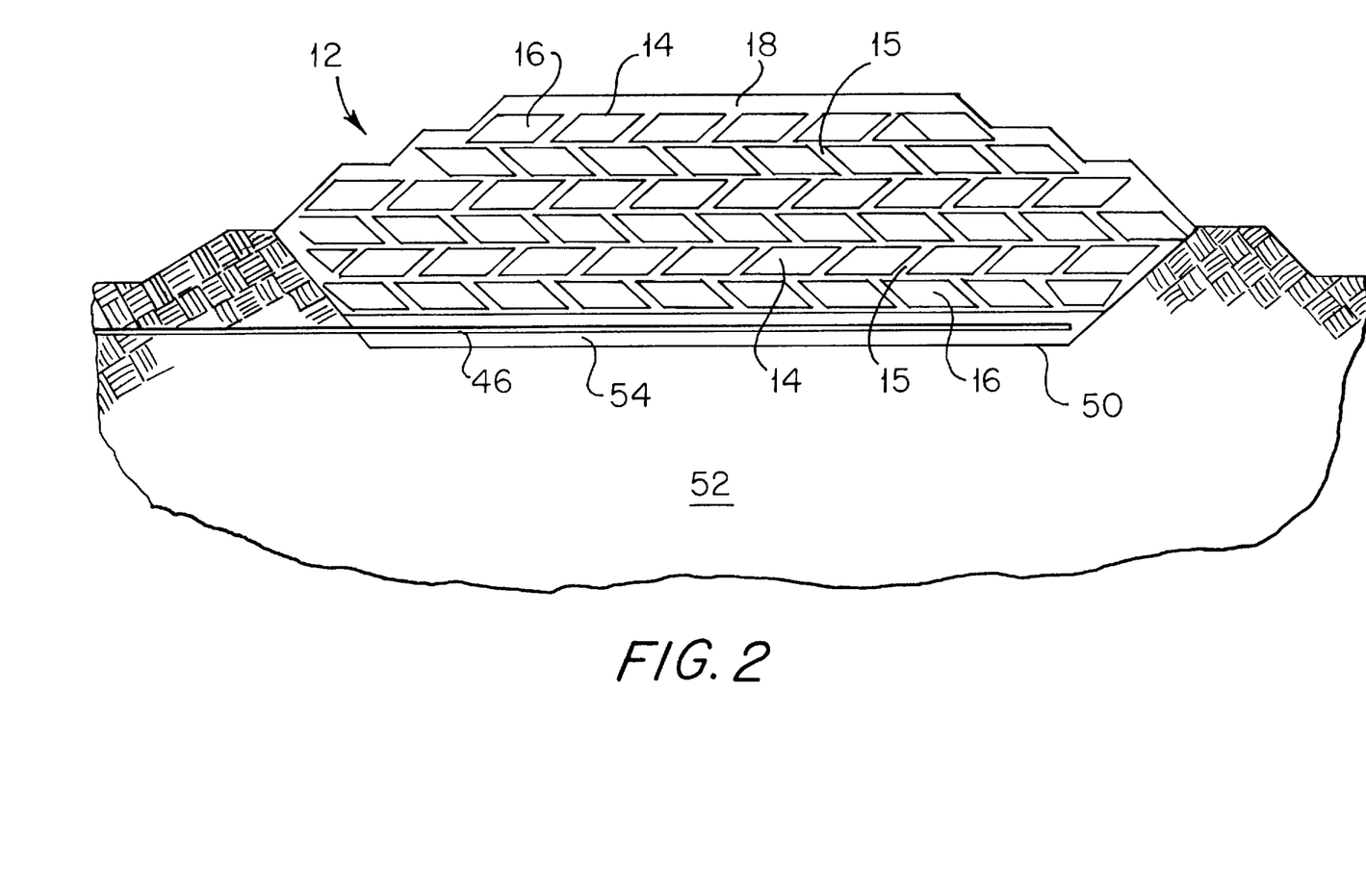
FIG. 2 is a cross-sectional view of a typical landfill site that has been filled and covered.
Figure 3:
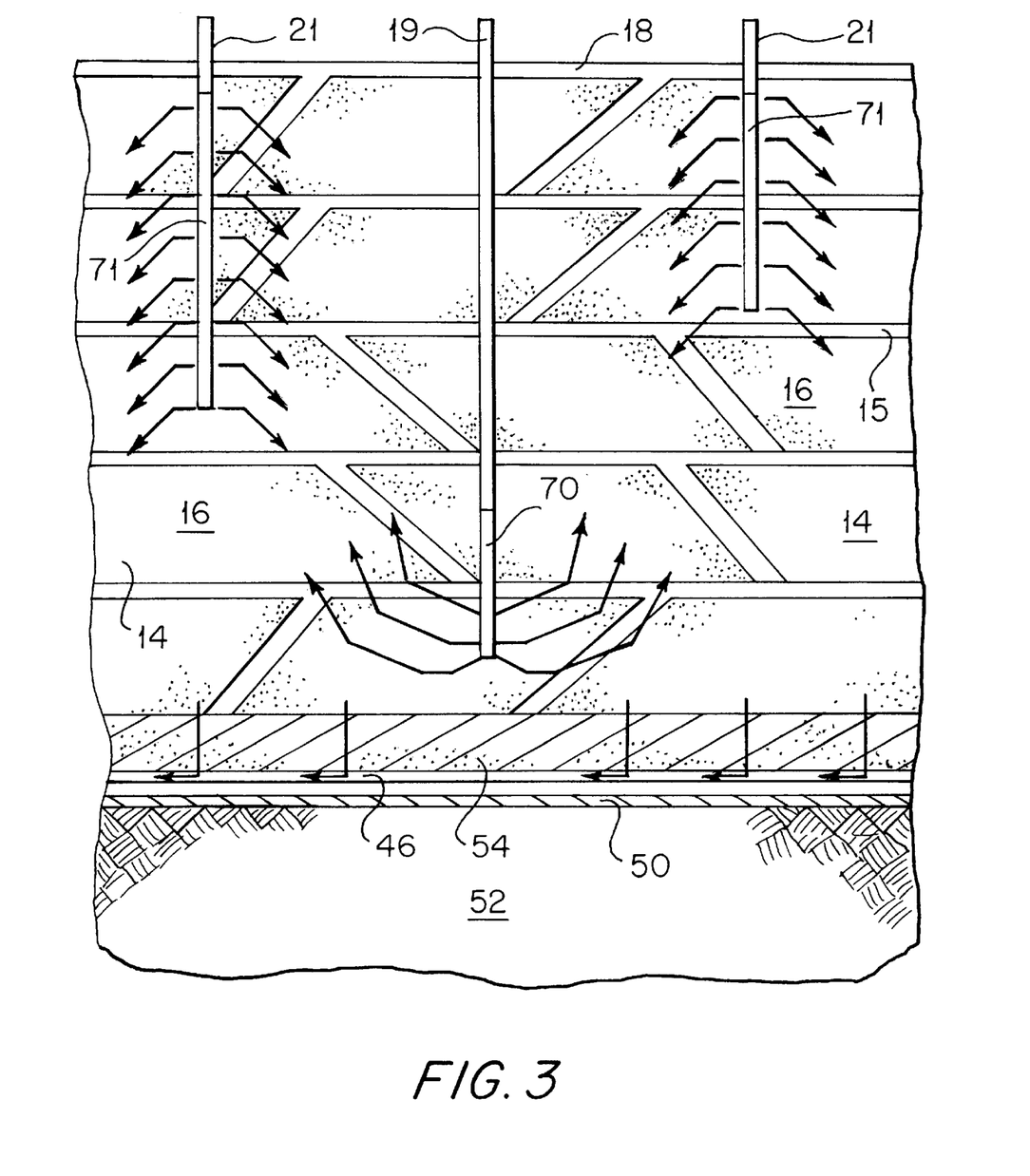
FIG. 3 is a cross-sectional view of the landfill site with the injection wells according to the present invention.

The structure of a conventional landfill site is illustrated generally in FIGS. 1 through 3. The landfill 12 consists of an excavated site that has preferably been lined with a conventional lining material 50 to prevent leachate from making its way into the surrounding earth 52 and ground water system. Such lined landfills are well known to those skilled in this art and a detailed explanation thereof is not necessary for purposes of understanding the present invention. However, it should be understood, that the present invention is not limited to a lined landfill. A substantial number of landfill sites exist wherein the landfill was never lined. The present invention has particular significance to these unlined landfills in that the bio-reduction process can be substantially accelerated to stabilize the landfill so that it no longer poses a threat to the environment.

Still referring to FIGS. 1 through 3, the structure of conventional landfills includes a conventional leachate collection system 46 that collects percolated leachate that has settled to the bottom of the landfill. The leachate collection system 46 may be established in a sand base 54 initially established in the landfill. Typically, municipal solid waste, generally 16, is deposited in the landfill on a daily basis. Layers or cells 14 of the waste material 16 are periodically covered with a layer of earth or dirt 15, generally also on a daily basis. Thus, pockets or cells 14 of the solid waste 16 are established in the landfill 12. Once the landfill has been filled to a predetermined amount, the site is covered with a suitable covering material 18. Covering 18 can be a layer of dirt of earth, typically including a substantial concentration of clay. Alternatively, cover 18 may also include a liner material similar to liner 50 used to line the bottom of the landfill.

With such conventional landfills, once the site is covered with material 18, a monitoring process must be established to monitor the site until it has stabilized. With conventional landfills, by regulation, this monitoring process can take up to thirty years. In conventional landfills, the stabilization process takes such a long time due to the fact that the waste material has been essentially entombed in the landfill so that substantially no oxygen or moisture is introduced into the landfill. The reduction that does take place is primarily anaerobic (without oxygen), which produces harmful and objectional byproducts, such as methane gas.

With the present invention, the biodegradation process is substantially accelerated to such an extent that stabilization of the degradation process may be complete within a matter of months. In this manner, at a landfill site wherein different areas of the site are sequentially filled and sealed, a recycling of the areas can be established wherein the necessity of opening an additional landfill is eliminated.

The process and system according to the invention establishes and maintains aerobic degradation of the waste material by increasing and maintaining the moisture content in the covered landfill from initial levels to preferably about 40% to about 70%. As will be discussed in more detail below, this is preferably accomplished by a moisture injection system that recycles leachate back into the landfill and supplements the recycled leachate with an additional water supply if necessary oxygen is also injected into the landfill in order to establish and then maintain aerobic degradation conditions. Preferably, the oxygen is supplied in the form of compressed air through an air injection system, as will be described in greater detail below. The temperature in the landfill is maintained in a range of preferably about 130° F. to about 150° F. to maintain primarily aerobic degradation. The temperature can be controlled in various ways, but preferably is maintained within the preferred range by controlling the amount of air and/or oxygen injected into the landfill. The addition of air is not only essentially to supply oxygen in order to maintain the aerobic degradation process, but the air has proven to be beneficial in carrying off excess heat build-up in the landfill from the microbial activity. Accordingly, the capability to deliver air to individual zones within the landfill is an important control mechanism of the present process.

Thus, it should be understood that the injection of ambient air serves two purposes in a preferred embodiment of the invention. First, the air supplies oxygen to the landfill in concentrations sufficient to establish and maintain aerobic degradation. Secondly, controlling the rate of air injection into the landfill is a preferred method to control the temperature in the landfill. The air has a dual affect on temperature. The flow of air into the landfill mass acts as a medium to carry off heat generated in the landfill as it escapes the landfill. This heat is generated primarily by the microbial activity in the waste material. Thus, more air is injected into the landfill to lower the temperature. Additionally, the additional oxygen injected into the landfill tends to kill off remaining anaerobic microbes since these microbes cannot live in the presence of oxygen. As the anaerobic microbes are eliminated, the heat they were generating is also eliminated. Thus, the injection of air further lowers the temperature in this regard.

However, it should be understood from the above discussion, that temperature can also be controlled by injecting another gas into the landfill, such as an inert gas that does not contain oxygen. This gas would then act only as a medium to conduct heat out of the landfill. In this method, a separate source of oxygen would need to be supplied to the landfill to sustain the aerobic activity. The addition of this additional source of oxygen would also have some affect on temperature.

The capability to deliver moisture to individual zones within the landfill is also an important control mechanism for the aerobic degradation. Moisture content of generally about 40% is essential for rapid aerobic degradation. Microbial activity, and therefore degradation, slows by several orders of magnitude below a moisture content of around 40%. Below 20%, degradation essentially ceases. Applicant has determined that an ideal moisture content in the landfill for aerobic degradation is about 60%. This moisture content allows for adequate oxygen diffusion through the waste material to support the rapid aerobic degradation. If the moisture content is too low, the landfill is dry and aerobic decomposition will cease. Conversely, if the moisture content is to high, diffusion of oxygen is hampered thereby limiting aerobic activity. Moisture measurements may be made by direct sampling of the landfill material through sampling wells, as discussed in more detail below, and calculations can be made to determine the amount of leachate and water to be added back to the landfill to maintain the moisture content within the desired range. Monitoring leachate generation rate and the moisture content of the evolving gases can also give a rough estimate of the moisture content of the landfill.

Accordingly, the present invention may also comprise monitoring the moisture content, temperature, and oxygen concentrations within the landfill and controlling additions of air and/or oxygen and/or moisture to maintain the moisture content of at least about 40% and the temperature in the range of preferably about 130° F. to about 150° F.

Although temperature can be controlled to some extent by increasing or decreasing the moisture content in the landfill, it is preferred to control temperature primarily by the addition or air or oxygen into the landfill, as discussed above.

Once the aerobic biodegradation process has been established in the desired temperature range and moisture content range, it is preferred that the oxygen concentration in the landfill be maintained relatively low but greater than 0%. The oxygen concentration should be greater than 0% to ensure that sufficient oxygen remains at all times in the landfill to sustain aerobic degradation. Levels of about 1% to 2% are preferred. The oxygen content should be kept relatively low so as to provide a control mechanism with a relatively large range for controlling temperature.

The inventive process and system also includes the capability to add additional nutrients or microbes into the landfill to further promote and sustain aerobic degradation. For example, nitrogen, phosphates, and a carbon source can be added or injected into the landfill to maintain optimal levels of microbial growth for the aerobic degradation. For example, a preferred concentration ratio of carbon to nitrogen in the range of about 20:1 to about 50:1 is desired. If it is determined that certain beneficial microbes are not naturally present in the landfill, such microbes can also be injected into the landfill.

The present invention also includes the means to establish conditions within the landfill to substantially eliminate harmful pathogens therein. The existence of such harmful pathogens is temperature dependent. A "pathogen kill range" is generally understood to be from about 135° F. to about 160° F. At lower temperatures of this range, the temperatures must be sustained for a longer period of time. For example, the pathogens can be eliminated substantially simultaneously with establishing and maintaining the conditions for aerobic degradation by maintaining the temperature within the landfill above about 135° F. for a period of about two weeks. However, at temperatures above 145° F., desired anaerobic microbial activity is decreased in that some of the desirable aerobic microbes are also killed. In an alternative embodiment, the pathogens can be eliminated prior to establishing the aerobic degradation conditions by increasing the temperature in the landfill above about 155° F. for at least about two days. At this temperature, the pathogens are effectively killed, but so are a substantial portion of the aerobic microbes. If this embodiment is used, it may be necessary to add additional microbes to the system prior to establishing the aerobic conditions.

The present invention also includes monitoring of gases generated in the landfill as an indication of the type and extent of degradation occurring therein. For example, methane gas is monitored as an indication of whether the degradation has turned to anaerobic activity. A methane gas concentration of about 50% by volume is a strong indication that the degradation process has turned anaerobic. Likewise, methane gas concentrations less than 10% by volume is a good indication that the degradation process is aerobic, particularly if air is injected into the system and oxygen concentrations remain relatively low.

Temperature is also continuously monitored, not only to ensure temperature control within the desired range, but also as an indication of the extent of degradation. A rapid drop in temperature despite injection of optimal amounts of air is a signal that degradation of degradable organic material is essentially complete. Degradation of more complex organic material, such as wood products containing organic compounds such as cellulose and lignin, may take additional months depending upon the composition of the remaining organic material. Once the less complex or readily degradable organic materials have decomposed, the landfill is in a stabilized state and the material no longer produces environmentally hazardous byproducts or objectional gases. At this point, approximately 60% of the remaining landfill material is compost. The landfill may be closed at this point, or conventional landmining may commence. If landmining is elected, closure and monitoring costs are avoided and reusable landfill space is recaptured for subsequent landfill operations. Thus, the same landfill can be continuously recycled. Also, the landmine material can also be used for agricultural or non-agricultural composting purposes.

At least one preferred system for practicing the method of the invention described above is illustrated generally in the figures. Referring particularly to FIGS. 1 through 3, the inventive system includes a landfill site 12 wherein waste material 16 has been deposited therein and covered with a cover material 18, as described above. A plurality of injection wells 20 are disposed through cover material 18 and provide access to waste material 16 in the landfill. Referring particularly to FIG. 3, the wells are either air injection wells 19 or moisture injection wells 21. Moisture injection wells 21 do not extend as far into the landfill and have a relatively long diffuser section 71 so that the moisture or water injected therefrom can percolate or seep substantially uniformly throughout the landfill mass on the other hand, the air injection wells 19 are substantially long and extend to relatively near the bottom of the landfill and include a relatively short diffuser section 70 so that the air is initially injected near the bottom of the landfill mass and allowed to uniformly diffuse and escape through the top of the landfill. As discussed above, this characteristic of the injected air allows for heat generated in the landfill to be carried off by the escaping air.

Figure 4:
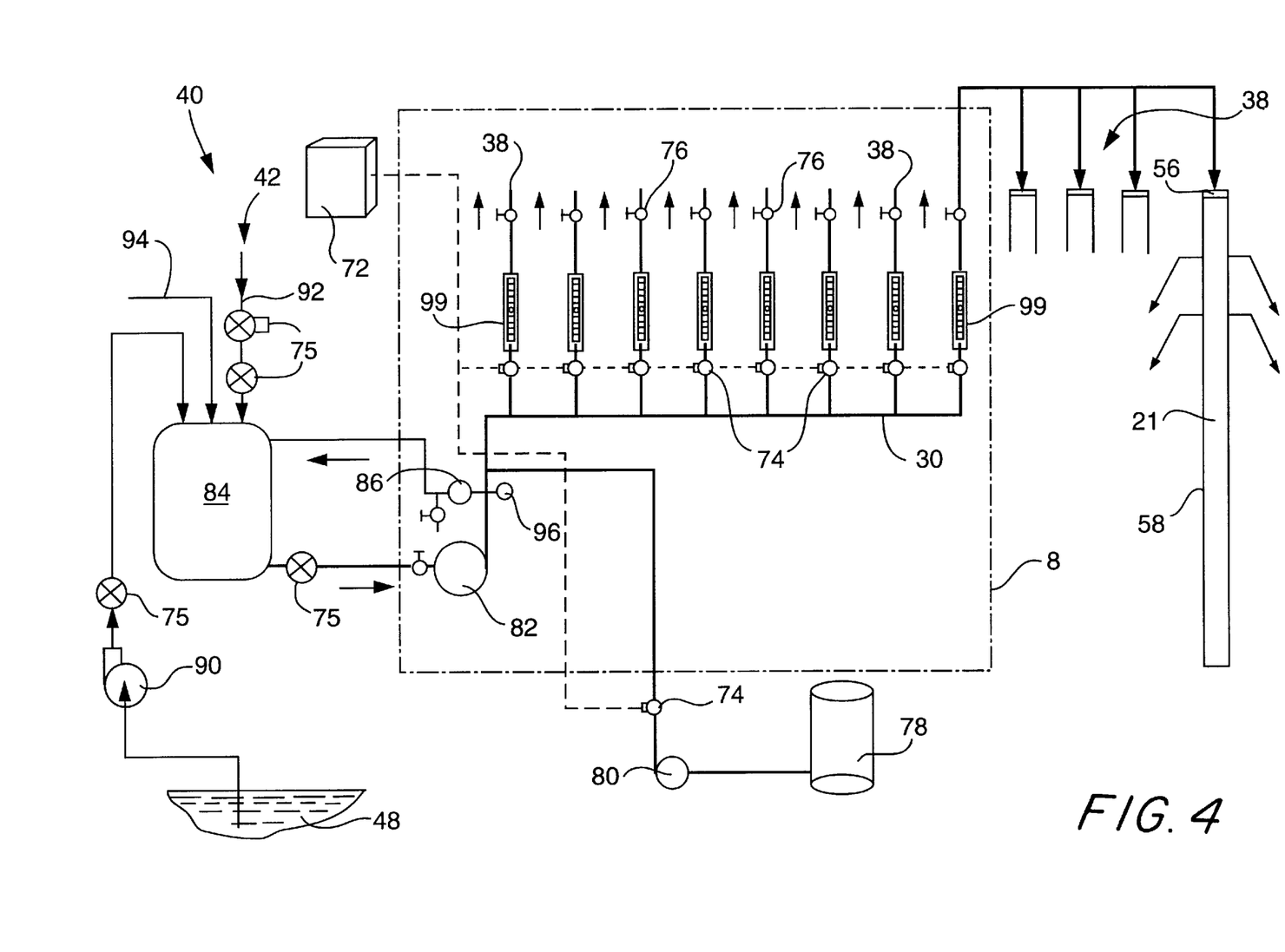
FIG. 4 is a diagram view of a moisture or water injection system according to the present invention.
Figure 5:
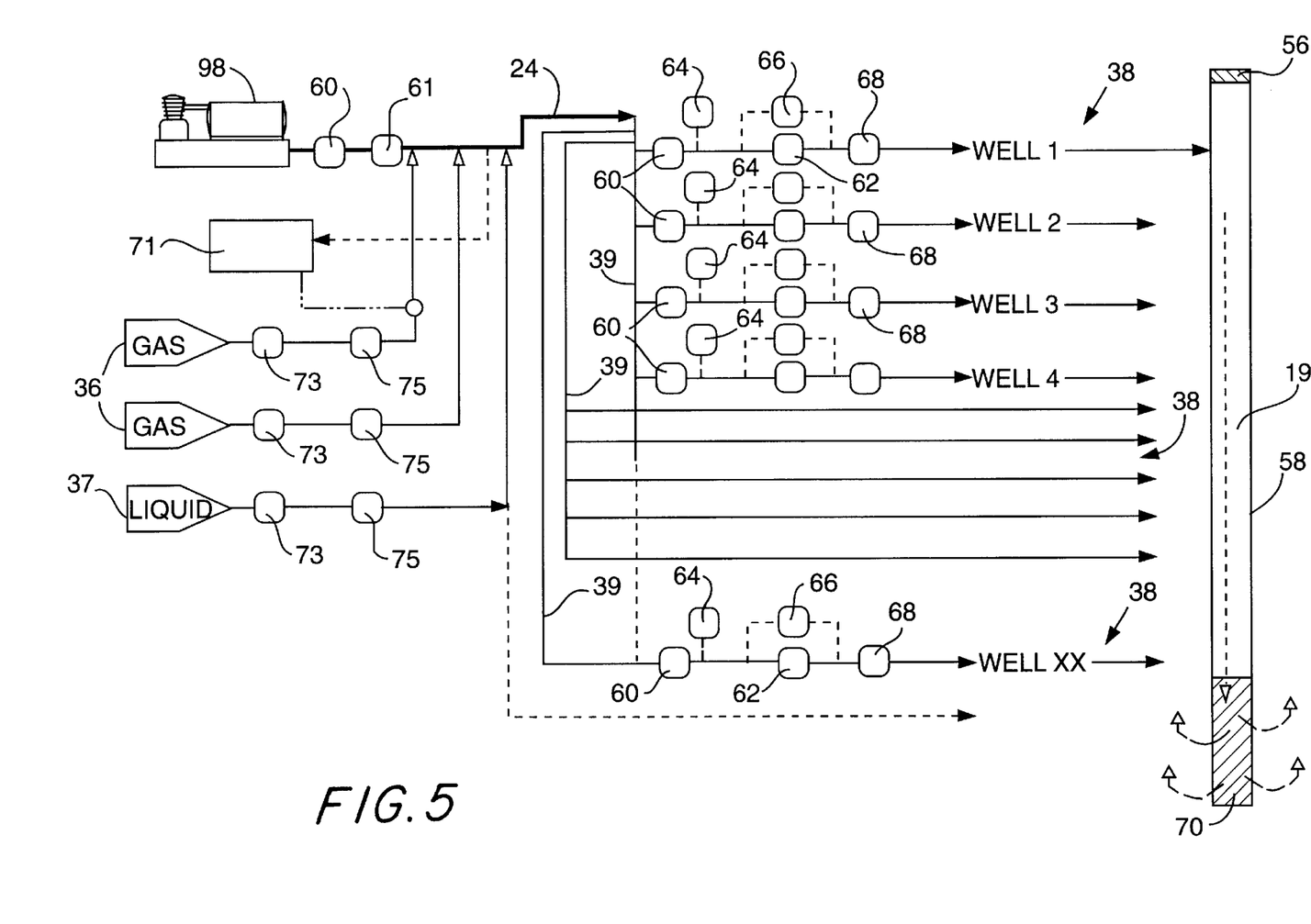
FIG. 5 is a diagram view of an air or oxygen injection system according to the present invention.

The wells are preferably formed of a lightweight poly material, such as PVC and are substantially hollow. Sections of PVC piping can define a well casing 58, as generally illustrated in FIGS. 4 and 5. The wells are capped by a cap member 56. Although not illustrated in the drawings, it should be understood that the injection wells, particularly the moisture injection wells 21, can also house sensors, such as temperature sensing devices. For example, a thermocouple could be housed in the wells to monitor the temperature of the landfill mass. Likewise, conventional gas sensors could be housed in the air injection wells to monitor particular gas concentrations in the landfill mass.

It should be understood that the injection wells are not limited to any particular type of material or configuration. For example, metal wells are just as applicable in the present invention. Likewise, the wells may comprise any shape or configuration.

Figure 6:
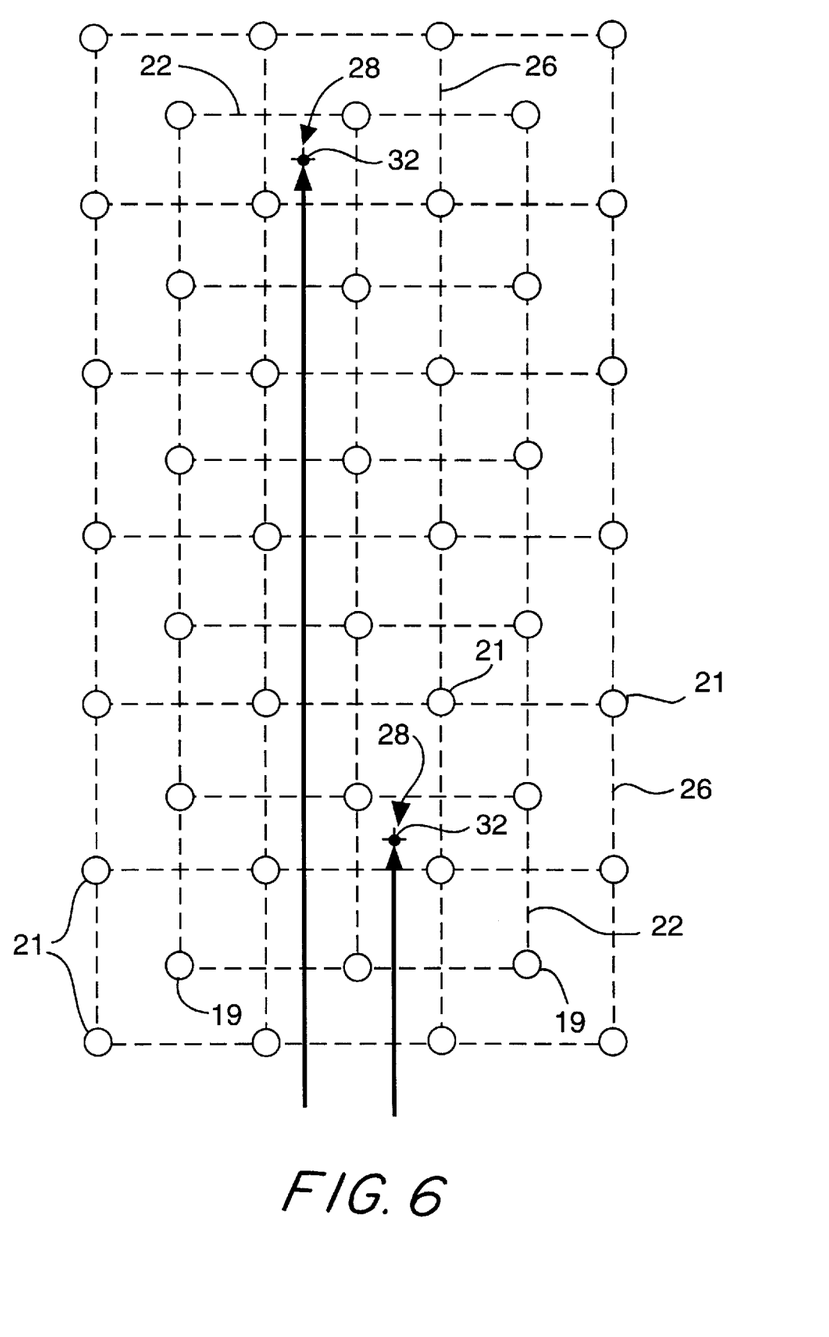
FIG. 6 is a diagram view illustrating a grid of air injection wells, moisture injection wells and sampling wells.

It is preferred that the wells are distributed in a grid pattern throughout the landfill site, as generally shown in FIG. 6. FIG. 6 shows a grid 26 of moisture injection wells 21 and a grid 22 of air injection wells 19. Although not particularly illustrated in FIG. 6, it should be understood that the wells 19, 21, are preferably divided into zones with each zone being independently controlled, as discussed in more detail below. FIG. 6 also illustrates sampling wells 28. These wells provide a means for taking samples from the landfill, such as core samples to measure moisture content. Also, temperature sensing devices 32, or other sensing devices, can also be configured with the sampling wells 28.

The present system also includes means for adding and maintaining oxygen concentrations in the landfill sufficient to promote and sustain aerobic degradation. An example of such means is the air injection system illustrated in FIG. 5. As discussed above, it is preferred that the oxygen necessary for sustaining the aerobic degradation be supplied in the form of ambient pressurized air. However, it should also be understood that oxygen can be separately supplied in a purer form. Referring to FIG. 5, an air compressor 98 is provided with a downstream pressure regulator 60 and relief valve 61. Although not illustrated, an accumulator or reservoir for pressurized air can also be supplied. The pressurized air is supplied to a main gas header 24. Gas header 24 supplies individual header lines 39 for respective zones 38 of the gas injection wells 19. For example, one such zone 38 contains wells 1 through 4, as particularly shown in FIG. 5. In the illustrated embodiment, each well is supplied by a line having its own pressure regulator 60, pressure gage 64, flow meter 66, flow regulator device 62, and gas measuring instrument 68. It should also be understood that any combination of these components can also be included in the header lines for each respective zone in addition to each well, or in place of the components for each well. Thus, all of the wells associated with a single zone could be controlled by a single set of valves, or individual wells within a zone can be individually controlled. It is well within the level of skill of those in this art to configure any desired piping and control system.

The air system also preferably includes a gas monitor 71 suitably configured to monitor various gases within the landfill. For example, monitor 71 can measure concentrations of methane gas and oxygen for the reasons discussed above.

Additional gas lines 36 may also be included as a means for adding additional nutrients or gases into the landfill. For example, lines 36 can be used to add nitrogen or other gases into the system. Additionally, lines 36 may be used to inject a purer form of oxygen into the landfill if necessary. As discussed above, the air injection system may also be used to inject an inert oxygen free gas into the landfill to control temperature, and not as a source of oxygen. In this case, oxygen would need to be supplied by an alternate source.

The additional gas lines 36 may also include a timing device 73 and/or control valve 75. These components may prove useful if, for example, it is empirically determined that certain nutrients must be injected into the land fill at established times. The control and/or timing devices can be programmed or established to automatically inject such nutrient gases.

A liquid supply line 37 may also be included with the gas injection system. This line may be necessary to inject liquid nutrients, for example, liquid phosphates, into the landfill by way of the air injection system. Liquid injection line 37 may also include a timing device 73 and control valve or device 75.

It should be understood that the air injection system illustrated in FIG. 5 is but a mere example of any suitable system that can be configured for use in the present invention. The invention however is not limited to any particular type of configuration. Those skilled in the art will recognize that any manner of air injection systems can be configured with the invention. For example it is totally a matter of design choice as to how many injection wells are utilized and as to the equipment for controlling the rate of injection. The source of compressed air is preferably a portable air compressor, but is not limited to this device. For example, the source of compressed air can be piped from off-site if desired. It should also be understood that the air injection system is preferably configured to be substantially automatic in operation. For example, the pressure regulator 60 could be electronically controlled from a central control station that activates such devices only when necessary to control temperature or increase oxygen concentrations. The system may just as well be completely manual. Any and all such modifications and variations in the system are within the scope and spirit of the invention.

The system also includes means for variably adding moisture into the landfill to maintain moisture content within a range of about 40% to about 70%. One preferred embodiment of a moisture injection system is illustrated in FIG. 4. However, it should be understood, that the system illustrated in FIG. 4 is not a limitation of the invention, but only shows one preferred embodiment. In the system illustrated in FIG. 4, the source of moisture 42 is preferably leachate collected from the leachate collection system and supplied to a holding tank 84 through a supply line 92. Control devices 75, such as electric solenoid valves, may be supplied in this line to automatically fill holding tank 84 when necessary. In this regard, tank 84 may include high and/or low level sensors to automatically initiate and stop filling thereof. An addition line 94 is provided into tank 84 so that other liquids, such as liquid nutrients, can be added into the system via the holding tank.

A make-up supply of water 48 is also interfaced with the system in the event that the leachate collection system does not generate adequate leachate to maintain the moisture content in the landfill within the desired range. It may be preferred that the alternate make-up supply 48 comprise a pond or reservoir established for this purposes. A make-up pump 90 is used to supply the make-up water supply to holding tank 84. An electronic control device, such as a solenoid valve 75, can also be utilized with the make-up supply source to automatically add make-up water when necessary.

A leachate addition pump 82 takes a suction from the holding tank 84 and distributes the leachate and/or water to a main header 30. A relief valve 86 may be included in the line so that the pump will recirculate back into the holding tank in an overpressure condition. A pressure gage 96 can be included to monitor system pressure.

It may also be desired to include a separate liquid addition tank 78 for adding additional types of liquid, such as liquid nutrients into the landfill. This tank may be configured with a pump 80 for this purpose and a control device or valve 74.

The header 30 supplies different zones 38 of moisture injection wells 21. In the embodiment illustrated, each zone 38 is controlled by a conventional flow controller 99. Automatic devices, such as electronic solenoid valve 74, are associated with each flow controller 99. Isolation valves 76 may also be included downstream of the flow controllers. A plurality of individual injection wells 21 are associated with each flow controller 99, as particularly seen in FIG. 4. As with the air injection system, it is also possible that each moisture injection well have its own associated control mechanism so as to be individually controlled separate from the zone control.

An electronic control system 72 is generally illustrated in FIG. 4 for automatic control of the moisture injection system. Controller 72 may be configured to automatically initiate moisture injection by, for example, automatically opening solenoid valves 74. Control system 72 may be configured on a timed automatic basis once it has been empirically determined how much moisture must be injected periodically into the landfill to maintain the desired moisture content. On the other hand, controller 72 may be responsive to a control signal to initiate moisture injection only upon reaching a low moisture level in the landfill. It should be readily appreciated that any manner of conventional control systems can be configured for automatic control of the moisture injection system, as well as the air injection system. It is also within the scope of the invention that the system be completely manual.

It is preferred that the entire system be relatively portable so that it can be easily removed from a landfill and used at another site. In this regard, the control equipment may be housed in wheeled trailers 8, as shown in FIG. 1. Referring to FIG. 1, the water/moisture control components 40 are housed in one trailer 8 and the air injection control components 34 are housed in another trailer. The air compressor 98 is also capable of being transported. Additionally, the individual wells 20 can be easily pulled from the landfill or even left in place. The well caps 56 are removably connected to their individual supply lines.

It should be understood by those skilled in the art that various modifications and variations can be made in the system without departing from the invention. For example, invention. For example, countless numbers of variations in the means for injecting air and moisture into the landfill are conceivable. Any and all such variations are within the scope and spirit of the invention. The present application covers such modifications and variations that come within the scope of the appended claims and their equivalents.

What is claimed is:

1. A method for treating biodegradable waste material that has been deposited in a landfill, said method comprising the steps of:

covering the waste material;

increasing and maintaining the moisture content in the landfill in a range from about 40% to about 70%;

injecting a source of oxygen into the landfill to drive and maintain microbic activity aerobic;

increasing the temperature in the landfill to a level and for a duration of time sufficient to substantially eliminate pathogens from the landfill;

controlling the temperature in the landfill in a range of about 130° F. to about 150° F. to sustain aerobic degradation; and monitoring any combination of oxygen content, moisture content, and temperature in the landfill and varying any combination thereof to maintain aerobic degradation in the landfill.

2. The method as in claim 1, further comprising establishing a grid of injection wells into the landfill and using the injection wells to inject moisture and oxygen into the landfill.

3. The method as in claim 1, wherein said step of injecting a source of oxygen comprises injecting ambient air into the landfill in sufficient amounts to maintain oxygen concentrations within the landfill above 0.0% to ensure sufficient oxygen is present to sustain aerobic degradation.

4. The method as in claim 3, wherein said step of controlling temperature comprises controlling the amount of air injected to vary temperature in the landfill.

5. The method as in claim 1, wherein said step of increasing and maintaining the moisture content in the landfill comprises recirculating leachate collected from the landfill back into the landfill.

6. The method as in claim 5, further comprising supplementing the leachate with a supply of make-up water.

7. The method as in claim 1, wherein said step of increasing the temperature in the landfill to a level and for a duration to substantially eliminate pathogens comprises raising the temperature above about 135 degrees F. for a period of time sufficient to kill off pathogens.

8. The method as in claim 7, comprising maintaining the temperature above about 135° F. and below about 145° F.

9. The method as in claim 1, wherein said step of increasing the temperature in the landfill to a level and for a duration to substantially eliminate pathogens comprises raising the temperature above about 155° F. for a period of time to kill off pathogens.

10. The method as in claim 1, further comprising monitoring gas generation rates within the landfill for indication that the aerobic degradation is being maintained.

11. The method as in claim 10, comprising monitoring generation of methane gas as an indication that degradation has moved to anaerobic degradation.

12. The method as in claim 1, further comprising monitoring temperature as an indication that degradation within the landfill has decreased.

13. The method as in claim 1, further comprising monitoring and adding if necessary at least one of nitrogen and phosphates to maintain optimal levels of aerobic microbial growth for the aerobic degradation.

14. The method as in claim 13, further comprising maintaining concentration ratios of carbon to nitrogen in a range of about 20:1 to about 50:1.

15. The method as in claim 1, further comprising closing the landfill once aerobic degradation has stabilized.

16. The method as in claim 1, further comprising landmining the landfill once aerobic degradation has stabilized.

17. The method as in claim 16, further comprising reusing the landfill after said landmining process.

18. A process for establishing and maintaining aerobic degradation in landfills, comprising the steps of:

establishing a moisture content within the landfill of least about 40%;

adding a source of oxygen into the landfill to promote aerobic microbial degradation of waste material within the landfill;

maintaining temperature within the landfill in the range of about 130° F. to about 150° F. so as to promote and maintain substantially aerobic microbial degradation while limiting anaerobic degradation by controlling amounts of oxygen and moisture added to the mass of waste material; and establishing conditions within the landfill to a level and for a duration to substantially eliminate pathogens from the landfill either prior to or during said step of maintaining temperature within the mass of waste material in the range of about 130° F. to about 150° F.

19. The method as in claim 18, further comprising monitoring moisture content, temperature, and oxygen concentrations within the mass of waste material and controlling additions of oxygen and moisture to maintain the moisture content of at least about 40% and the temperature in the range of about 130° F. to about 150° F.

20. The method as in claim 19, wherein said step of adding a source of oxygen comprises injecting air into the landfill in amounts sufficient to ensure oxygen concentrations are maintained above 0.0%, and wherein said step of maintaining temperature comprises controlling temperature primarily by varying the amounts of air injected into the landfill.

21. The method as in claim 18, wherein the pathogens are eliminated during said step of maintaining temperature within the mass of waste material in the range of about 130° F. to about 150° F. by increasing temperature within the range to a level and for a duration sufficient to eliminate the pathogens.

22. The method as in claim 18, further comprising adding oxygen and moisture to the landfill through a grid of wells established in the landfill.

23. The method as in claim 18, wherein said step of establishing a moisture content within the landfill of least about 40% comprises recirculating leachate through the landfill and supplementing the leachate with a make-up supply of water.

24. A system for aerobic degradation of biodegradable waste material, comprising:
 a landfill site wherein said waste material has been deposited therein and covered with a cover material;
 a plurality of injection wells disposed through said cover material providing access to said waste material, wherein said injection wells comprise a grid of gas injection wells supplied from at least one main gas header, and a grid of moisture injection wells supplied from at least one main moisture header;
 means for monitoring moisture content, oxygen concentrations, and temperature within said landfill;
 means for adding and maintaining oxygen concentrations in said landfill sufficient to promote and sustain aerobic degradation;
 means for controlling temperature in said landfill within a range of about 130° F. to about 150° F.; and
 means for variably adding moisture into said landfill through said injection wells so as to maintain aerobic degradation conditions of moisture content in the landfill within a range of about 40% to about 70%.

25. The system as in claim 24, wherein said means for monitoring comprises at lest one well disposed through said covering material into said landfill providing access for sampling conditions within said landfill, a temperature sensing device configured for measuring temperature of said landfill, and at least one gas analyzer device configured to measure at least one of oxygen, methane, and $CO_2$ concentrations within said landfill.

26. The system as in claim 24, wherein said means for adding and maintaining oxygen concentrations comprises a substantially automated air system for adding air under pressure into said landfill through a plurality of said injection wells to maintain oxygen concentrations within said landfill above 0.0% in response to sensed oxygen concentrations from said monitoring means.

27. The system as in claim 26, wherein said air system comprises a grid of said injection wells supplied from at least one gas header in communication with a source of compressed air, and further comprising at least one gas addition line for adding supplementing gasses into said landfill to promote the aerobic degradation.

28. The system as in claim 27, wherein said grid of injection wells is divided into zones within the landfill, each said zone containing a plurality of said injection wells.

29. The system as in claim 28, wherein each of said zone is automatically controllable to vary oxygen concentrations in different areas of said landfill.

30. The system as in claim 28, wherein each of said injection wells is automatically controllable to vary the amount of air injected into the landfill through said respective injection well.

31. The system as in claim 24, wherein said means for adding moisture comprises a substantially automated water system for adding water into said landfill through a plurality of said injection wells to maintain moisture content within said landfill within said aerobic range in response to sensed moisture content from said monitoring means.

32. The system as in claim 31, wherein said water system comprises a grid of said injection wells supplied from at least one water header in communication with a source of water, and further comprising at least one fluid addition line for adding supplementing fluids into said landfill to promote aerobic degradation.

33. The system as in claim 32, wherein said source of water comprises a leachate collection system so that leachate collected from said landfill is recirculated back into said landfill.

34. The system as in claim 33, further comprising a make-up supply of water to augment said leachate collection system.

35. The system as in claim 32, wherein said grid of injection wells is divided into zones, each of said zones comprising a plurality of said injection wells.

36. The system as in claim 35, wherein each of said zones is automatically controllable to vary moisture content within different areas of said landfill supplied by said respective zones.

37. The system as in claim 24, wherein said system is portable and can be relocated to other said landfills.

38. The system as in claim 24, wherein said means for controlling temperature comprises a temperature sensing device operably configured to monitor temperature within the landfill, wherein temperature is controlled and maintained by controlling any combination of amount of moisture, air, or oxygen introduced into said landfill in response to sensed temperature from said temperature sensing device.

39. The system as in claim 38, wherein said air addition system is a component of said means for adding and maintaining oxygen concentrations.

40. The system as in claim 24, wherein said means for controlling temperature comprises a gas injection system configured with at least some of said injection wells, wherein temperature within said landfill is controlled by amounts of gas injected into said landfill.

41. The system as in claim 40, wherein said gas injection system comprises an ambient air injection system.

42. The system as in claim 41, wherein said air injection system is a component of said means for adding and maintaining oxygen concentrations.

43. The system as in claim 24, wherein said means for controlling temperature cooperates with said means for adding and maintaining oxygen, wherein temperature is controlled by oxygen concentrations within said landfill.

* * * * *